R. C. HARTLEB.
FISH SCALER.
APPLICATION FILED MAR. 15, 1922.
1,424,722.  Patented Aug. 1, 1922.
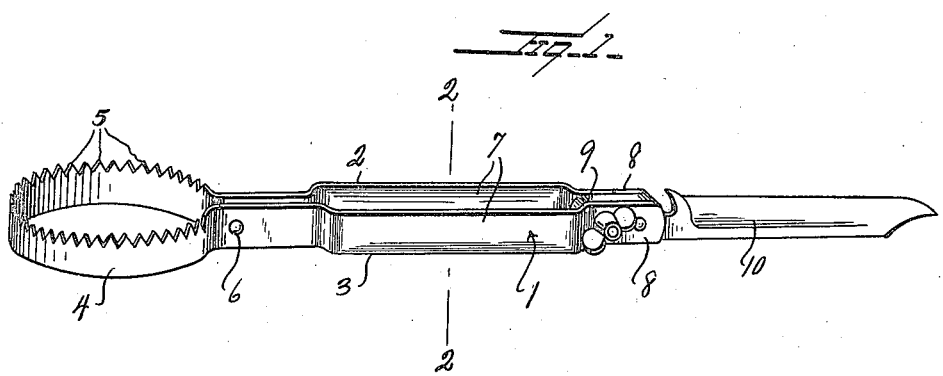
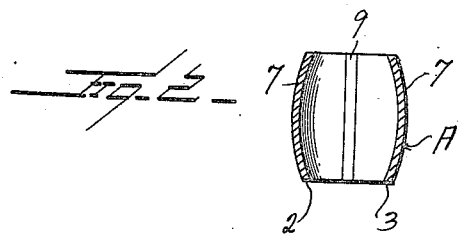
Inventor
Rudolph C. Hartleb
By Watson E. Coleman
Attorney

UNITED STATES PATENT OFFICE.

RUDOLPH C. HARTLEB, OF CAMBRIDGE, MARYLAND, ASSIGNOR OF ONE-HALF TO EMANUEL REINER, OF BALTIMORE, MARYLAND.

FISH SCALER.

1,424,722. Specification of Letters Patent. Patented Aug. 1, 1922.

Original application filed July 18, 1921, Serial No. 485,489. Divided and this application filed March 15, 1922. Serial No. 544,003.

*To all whom it may concern:*

Be it known that I, RUDOLPH C. HARTLEB, a citizen of the United States, residing at Cambridge, in the county of Dorchester and State of Maryland, have invented certain new and useful Improvements in Fish Scalers (the same being a division of my pending application Serial No. 485,489, filed July 18, 1921), of which the following is a specification, reference being had to the accompanying drawings.

This invention relates to improvements in fish scalers and is a division of my pending application, Serial No. 485,489, filed July 18, 1921, and it is an object of the invention to provide a novel and improved device of this general character which can be conveniently manipulated to scale a fish.

The invention consists in the details of construction and in the combination and arrangement of the several parts of my improved fish scaler whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in perspective of a fish scaler constructed in accordance with an embodiment of my invention; and Figure 2 is a sectional view taken substantially on the line 2—2 of Figure 1.

As disclosed in the accompanying drawings, 1 generally represents the body of the device which is constructed of a single piece or strip of sheet metal doubled upon itself to form opposite sides 2 and 3. In the bight or connecting portion of the sides 2 and 3 the body 1 is formed into a circular head or jaw 4, one edge of which is formed to produce the serrations or saw teeth 5 which serve to remove the scales of the fish.

Immediately adjacent the jaw or head 4 the sides 2 and 3 are brought together and preferably joined by a rivet 6 which holds the parts against lateral or longitudinal relative shifting. The sides are then widened out so as to produce the handle 7 and the sides 2 and 3 throughout the length of the handle are made concavo-convex with the outer face convex as shown. Beyond the handle and at the opposite end of the sides 2 and 3 from the head 4, the sides are bent inwardly toward one another so as to produce the parallel extensions 8 between which the butt end 9 of the knife blade 10 is pivoted.

In operation, the handle is grasped by the operator and the jaw or head 2 with its accompanying saw teeth pulled over a side of a fish which readily removes the scales. The instrument may then be readily reversed in the hand of the operator and the knife blade 10 used for cleaning the fish in the usual manner.

From the foregoing description it is thought to be obvious that a fish scaler constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. A device of the class described comprising a member constructed of a single piece of metal bent back upon itself to have substantially parallel sides, means for connecting the outer extremities of said sides, the intermediate portion of the member being enlarged to provide a head, a marginal portion of said head having serrations.

2. A device of the class described comprising a member constructed of a single piece of metal bent back upon itself to have substantially parallel sides, means for connecting the outer extremities of said sides, the intermediate portion of the member being enlarged to provide a head, a marginal portion of said head having serrations, the enlarged portion of the member being substantially circular.

3. A device of the class described comprising a member constructed of a single piece of metal bent back upon itself to have substantially parallel sides, means for connecting the outer extremities of said sides, the intermediate portion of the member being enlarged to provide a head, a marginal portion of said head having serrations, intermediate portions of the sides being separated to produce a handle.

In testimony whereof I hereunto affix my signature.

RUDOLPH C. HARTLEB.